(12) United States Patent
Winistörfer et al.

(10) Patent No.: US 11,761,208 B2
(45) Date of Patent: Sep. 19, 2023

(54) ANCHOR SLEEVE AND ANCHOR SYSTEM

(71) Applicant: CARBO-LINK AG, Fehraltorf (CH)

(72) Inventors: Andreas Winistörfer, Fehraltorf (CH); Andreas Langenegger, Fehraltorf (CH)

(73) Assignee: CARBO-LINK AG, Fehraltorf (CH)

( * ) Notice: Subject to any disclaimer, the term of this patent is extended or adjusted under 35 U.S.C. 154(b) by 14 days.

(21) Appl. No.: 17/252,618

(22) PCT Filed: Jun. 19, 2019

(86) PCT No.: PCT/EP2019/066278
§ 371 (c)(1),
(2) Date: Dec. 15, 2020

(87) PCT Pub. No.: WO2020/002111
PCT Pub. Date: Jan. 2, 2020

(65) Prior Publication Data
US 2021/0254340 A1    Aug. 19, 2021

(30) Foreign Application Priority Data

Jun. 25, 2018 (CH) ...................................... 00798/18

(51) Int. Cl.
*E04C 5/12* (2006.01)
(52) U.S. Cl.
CPC .............. *E04C 5/127* (2013.01); *E04C 5/122* (2013.01)
(58) Field of Classification Search
CPC ................................ E04C 5/122; E04C 5/127
(Continued)

(56) References Cited

U.S. PATENT DOCUMENTS 5,788,398 A * 8/1998 Sorkin ...................... E04C 5/12
                                                            52/223.13
5,802,788 A * 9/1998 Ozawa ..................... E04C 5/122
                                                            52/223.13
(Continued)

FOREIGN PATENT DOCUMENTS

BE          447 375 A     10/2000
CN         10432861 A      5/2015
(Continued)

OTHER PUBLICATIONS

EPO (Riswijk, NL), English language version of the International Search Report, Form PCT/ISA/210, for International Application PCT/EP2019/066278, dated Jul. 25, 2019 (3 pages).
(Continued)

*Primary Examiner* — Brian E Glessner
*Assistant Examiner* — James J Buckle, Jr.
(74) *Attorney, Agent, or Firm* — Pauley Erickson & Swanson

(57) ABSTRACT

The invention is directed to an anchor sleeve (100) for an anchor system (1) suited for anchoring of a composite tension member (300). The anchor sleeve (100) comprises a sleeve base body (101) that has a receiving opening (105) configured to receive an anchor body (200) and extending from a sleeve front opening (121) arranged at a sleeve front end (120) to a sleeve rear opening (131) arranged at a sleeve rear end (130). The sleeve base body (101) is at least partially made from a fiber-reinforced plastic comprising reinforcing fibers whereof at least a portion is wound about the receiving opening (105).

20 Claims, 4 Drawing Sheets

(58) Field of Classification Search
USPC .................................................... 52/223.13
See application file for complete search history.

(56) References Cited

U.S. PATENT DOCUMENTS

| | | | | |
|---|---|---|---|---|
| 6,017,165 | A * | 1/2000 | Sorkin | E04C 5/122 |
| | | | | 403/374.1 |
| 6,817,148 | B1 * | 11/2004 | Sorkin | E04C 5/12 |
| | | | | 52/223.13 |
| 7,195,417 | B2 * | 3/2007 | Shiao | F16C 3/02 |
| | | | | 416/198 A |
| 8,069,624 | B1 * | 12/2011 | Sorkin | E04C 5/12 |
| | | | | 403/374.1 |
| 9,982,434 | B1 * | 5/2018 | Crigler | E04C 5/122 |
| 10,633,862 | B2 * | 4/2020 | García Acón | F03D 13/10 |
| 2010/0209185 | A1 * | 8/2010 | Kirth | B29C 70/86 |
| | | | | 403/292 |
| 2016/0333583 | A1 * | 11/2016 | Gan | E04C 5/122 |
| 2017/0016233 | A1 * | 1/2017 | Sorkin | E04C 5/122 |
| 2017/0275881 | A1 * | 9/2017 | Sorkin | E04C 5/12 |
| 2018/0106042 | A1 * | 4/2018 | Tanaka | E01D 19/16 |
| 2019/0242131 | A1 * | 8/2019 | Scott | E04C 5/122 |
| 2022/0056884 | A1 * | 2/2022 | Huang | E04H 12/342 |

FOREIGN PATENT DOCUMENTS

| | | |
|---|---|---|
| CN | 105625641 A | 6/2016 |
| EP | 0 291 601 A1 | 11/1988 |
| EP | 2 516 754 A1 | 10/2012 |
| WO | WO 95/29308 A1 | 11/1995 |
| WO | WO 03/008702 A2 | 1/2003 |
| WO | WO 2012/02278 A1 | 2/2012 |
| WO | WO 2013/124304 A1 | 8/2013 |
| WO | WO 2015/049395 A1 | 4/2015 |

OTHER PUBLICATIONS

EPO (Riswijk, NL), Written Opinion of the International Searching Authority, Form PCT/ISA/237, for International Application PCT/EP2019/066278, dated Jul. 25, 2019 (7 pages).

* cited by examiner

ANCHOR SLEEVE AND ANCHOR SYSTEM

BACKGROUND OF THE INVENTION

Field of the Invention

The present invention is directed to an anchor sleeve for an anchor system as well as to an anchor system comprising such an anchor sleeve. The present invention is further directed to a method for producing of such an anchor sleeve.

Discussion of Related Art

WO 95/29308 was published on 2 Nov. 1995 on behalf of EIDGENÖSSISCHE MATERIALPRUFÜNGS—UND FORSCHUNGSANSTALT EMPA and shows an anchorage device for high-performance fiber composite cables. The publication discloses a conical anchor system for anchoring one or several load-carrying, stressed or prestressed tie elements having a conical anchoring sleeve and an anchoring body that fits in the anchoring sleeve and retains the tie elements. In order to prevent the tie elements from tearing out of the anchoring body and to prevent the anchoring body itself from breaking up, the stiffness of the gradient material of which the anchoring body is made increases from the entrance of the tie element into the anchoring sleeve to the rear part of the anchoring sleeve.

WO 03/008702 A2 was published on 30 Jan. 2003 on behalf of AIR LOGISTICS CORPORATION and discloses composite tensioning members and a method for manufacturing same. The composite tensioning member comprises a wedge plug which is formed around a bundle of composite rods and is inserted into a termination fitting having an aperture at a proximal end for receipt of the bundle of composite rods. The termination fitting body further comprises an internal cavity that flares outwardly from a proximal end to a distal end to closely receive the wedge plug with the composite rods imbedded therein. A closenut is used to retain the wedge plug in the termination body. The publication discloses that the termination fitting comprises a termination fitting body formed of a strong material, such as stainless steel, titanium and other materials. The document further discloses that the closenut may have external threads to be interconnected with internal threads arranged in the termination fitting body.

WO 2013/124304 A1 was published on 29 Aug. 2013 on behalf of SIKA TECHNOLOGY AG and discloses a device for introducing a force into tension members made of fiber-reinforced flat-strip plastic lamellas. The device according to said device comprises at least one clamping device which is arranged on the tension member and which has at least one surface in contact with the tension member. At least one sleeve is arranged around the clamping element and the tension member and exerts a clamping pressure on the tension member via the clamping element. The clamping elements as a whole have a structure without a wedge temper and thus have a wedge-shaped or conical structure. The cross-section reduction runs against the tension direction of the tension member. The sleeve has an interior shape which is suitable for receiving the at least one clamping element and for exerting a clamping pressure.

WO 2012/022783 A1 was published on 23 Feb. 2012 on behalf of SIKA TECHNOLOGY AG and discloses a device for introducing force into tension members made of fiber-reinforced plastic flat strip lamella. The device can include at least one clamping element, which is arranged on the tension member and has at least one contact face with the tension member. At least one rigid sleeve can be arranged around the at least one clamping element and the tension member and thereby exerts a clamping pressure on the tension member via the clamping element. The clamping element can be formed of plastic material. According to the document, the sleeve can include, for example, a plastic, a metal, a metal alloy or another highly rigid material. The sleeve can include fiber-reinforced plastic or steel, for example, carbon fiber-reinforced plastic on an epoxy resin basis. The sleeve is pushed or drawn over the at least one clamping element and the tension member so that a clamping pressure is exerted on the tension member.

SUMMARY OF THE INVENTION

Various systems are known to anchor composite tension members. For high performance anchoring of composite tension members, in particular of composite tension members comprising carbon reinforcing fibers, so called cast anchoring systems have been preferred. In these systems composite rods, wires or cables are embedded in an anchor body typically made from a plastic material having a specific geometry and local stiffness. In order to apply external loads from a structure to the anchor body and from there to the composite tension members, the anchor body is typically mounted in an anchor casing which comprises mechanical connection means like threads to be interconnected with an external structure to apply an external force. Anchor casings need to have a certain mechanical total competence as well as they must have a specific global and local stiffness in order to transfer/transmit the external load in a specified way to the anchor body. In practice, anchor casings made of metals have prevailed, in particular such made of steel. However, to obtain an optimum distribution of stress and strain in particular in the anchor body, such casings must be manufactured, at least in certain areas, with very small tolerances. This makes production of anchor casings relatively expensive and demanding. As well, differences in thermal expansion of metals, plastics and composites must be taken into account.

For certain applications, e.g. in civil engineering, tension members that have a diameter of more than 0.2 m (meters) are common and even tension members with diameters of 0.5 m and more are possible. Consequently, for anchorage of such tension members, anchor casings with significant dimensions are needed. Casting, forging and machining of such metal components turns out to be difficult if not impossible, making overall production expensive.

In addition, conventional types of anchor casings made from metals typically have a significant weight which on the one hand makes their transport and installation difficult. On the other hand, depending on the orientation of the tension members in space, the anchor casings may also effect significant lateral loads on an anchor body and/or tension members embedded in the anchor body, which has a negative effect on the total performance of an anchor system.

In order to solve at least one of the herein mentioned problems, according to the present invention an anchor sleeve or anchor casing for an anchor system suited for anchoring of a composite tension member typically comprises a sleeve base body that has a receiving opening configured to receive an anchor body. The receiving opening typically extends from a sleeve front opening, that is arranged at a sleeve front end, to a sleeve rear opening, that is arranged at a sleeve rear end. The sleeve base body is at least partially made from a fiber-reinforced plastic comprising reinforcing fibers whereof at least a portion is wound about the receiving opening, respectively about a central longitudinal axis of the anchor sleeve if present. However, some of the reinforcing fibers may also have other orientations and e.g. may not or only partially be wound about the opening, as will be explained in more detail below. In a variation of the invention at least a portion of the reinforcing fibers is wound in circumferential direction about receiving opening. Within the context of the present invention tension members may typically be composite rods, composite wires, composite cables or combinations thereof. However, it is clear that the present invention is not limited for being used in combination of named types of tension members but may also be used for other types of tension members to be anchored.

Thus even very large anchor sleeves can be obtained having outer dimensions of up to 0.5-1 m (meters) and even more. In addition, for certain applications such anchor sleeves may also be produced on site and may even be manufactured on already installed ropes or bodies.

Various types of fibers may be used, such as carbon fibers, glass fibers, aramid fibers, mineral fibers and combinations thereof. However, the invention is not limited to these types of fibers.

Good results may be obtained, if at least a portion of the reinforcing fibers are long fibers. Hence, good results may be obtained if at least a portion of the fibers are not short fibers.

An anchor sleeve that has a particularly advantageous and balanced stress and strain distribution and hence allows efficient utilization of material can be obtained if the sleeve base body has an essentially rotationally symmetric shape. Anchor sleeves according to such a variation of the invention are typically particularly relatively lightweight and comprise a high mechanical competence as well as durability if compared to conventional anchor sleeves and can be produced at relatively low cost. However, the present invention is not limited to anchor sleeves having essentially rotationally symmetric shapes. For some applications also e.g. elliptic, rectangular, hexagonal or other cross-sections (and combinations thereof) may be possible. Hence, for certain applications the invention allows, if necessary, to produce sleeves which are adapted to the shape of hexagonal close-packed bundles of composite rods.

Typically at least a portion of the receiving opening constitutes a sleeve interior surface that is configured to contact at least part of an exterior surface of an anchor body, as will be shown in more detail below.

In a variation of the invention, the anchor sleeve is an integral part. Alternatively, the anchor sleeve may be assembled from multiple members, respectively be a multi-part sleeve.

In a variation of the invention, the sleeve interior surface comprises a locking means to obtain a positive-locking connection to an exterior surface of an anchor body. Such a means may e.g. be a protrusion and/or a notch and/or an opening that interacts with a corresponding locking means arranged at the anchor body.

An anchor system that allows to obtain particularly good anchorage of a tension member may be obtained of at least a portion of the sleeve interior surface has a frustum-like shape. Good results may be obtained if the narrow end of the frustum is arranged at the front end of the sleeve base body and the broad end is arranged at the rear end of the sleeve base body. The frustum may e.g. have a parabolic shape.

Good force transmission to an anchor body may be obtained if the diameter of the sleeve front opening is smaller than the diameter of the sleeve rear opening.

In order to obtain a particularly advantageous stress and strain distribution in the anchor sleeve as well as an anchor body to be interconnected with it, the fiber volume ratio may vary in the sleeve base body between the sleeve front end and the sleeve rear end. Hence, local stiffness of the anchor sleeve in longitudinal direction and/or in circumferential direction may be easily adapted in order to optimize anchorage of a tension member to be terminated, as will be shown in more detail below.

Alternatively or in addition, orientation of the reinforcing fibers may vary in the sleeve base body between the sleeve front end and the sleeve rear end. In a variation of the invention the sleeve base body may have a sleeve middle section arranged between the sleeve front end and the sleeve rear end and which is reinforced with fibers having a first fiber orientation of between +/−10° and +/−80° relative to the longitudinal axis of the sleeve base body and wherein the sleeve front end and the sleeve rear end are reinforced with fibers having a second fiber orientation of between +/−80° and +/−90° relative to the longitudinal axis of the sleeve base body. It turned out that thus a stress and strain distribution that is particularly advantageous for many applications can be obtained.

For some applications, a first portion (e.g. layer) of fibers having a first Young's modulus may be arranged at a first distance apart from the sleeve interior surface. The first portion of fibers may be arranged adjacent to the sleeve interior surface. A second portion (e.g. layer) of fibers having a second Young's modulus may be arranged at as second distance apart from the sleeve interior surface. In such a variation of the invention, the first distance is less than the second distance and the first Young's modulus is less than the second Young's modulus. Thus, a particularly even stress and strain distribution can be obtained in the anchor sleeve which leads to a more efficient use of the reinforcing fibers. Consequently the total volume and consequently also total weight of the anchor sleeve can be reduced. As well, depending on the production method, the number of superimposed fibers, respectively layers of fibers, may be reduced and hence production be accelerated.

In a variation of the invention, the sleeve base body comprises at least one layer of reinforcing fibers that are arranged essentially in parallel with the longitudinal axis of the sleeve base body. Thus force transmission for certain applications can be improved.

In a variation of the invention the wall thickness of the sleeve base body is essentially constant between the sleeve front end and the sleeve rear end.

However, for some applications the wall thickness of the sleeve base body may also change between the sleeve front end and the sleeve rear end. In a variation of the invention the wall thickness of the sleeve base body at the sleeve front end may be lower than the wall thickness at the sleeve rear end. Alternatively, the wall thickness of the sleeve base body at the sleeve front end may be higher than the wall thickness at the sleeve rear end. For some applications, the wall thickness of the sleeve base body at the sleeve front end and/or the sleeve rear end may be higher than the wall thickness at a sleeve middle section arranged between the sleeve front end and the sleeve rear end. Thus application of an external force at the sleeve front end and/or the sleeve rear end may be improved.

In a variation of the invention the sleeve base body comprises at least one layer of braided fibers. Alternatively or in addition the sleeve base body may comprises at least one layer of woven fibers. Alternatively or in addition, the sleeve base body may comprise at least one layer fibers formed from a roving wound about the receiving opening.

For some applications, the sleeve base body comprises a first force application means to apply an external force to the sleeve base body. If the anchor sleeve is provided for anchorage of a tension member, then the external force to be transmitted to the tension member will typically be essentially in parallel with the longitudinal axis of the anchor sleeve.

The first force application means may comprise a protrusion that protrudes from an exterior surface of the anchor sleeve. In a variation of the invention, the first force application means is at least partially constituted by a thickening of the sleeve base body.

For some applications, the first force application means may be arranged at the sleeve front end. The first force application means may also be arranged at the sleeve rear end or at a sleeve middle section arranged between the sleeve front end and the sleeve rear end. An anchor sleeve may also comprise a second force application means that may be arranged at the same locations as described herein for the first force application means and may be formed as described herein in context with the first force application means. Such a second force application means may be used in order to apply force alternatively or in addition to the first force application means. An anchor sleeve may comprise Additional force applications means that may be formed and arranged as described herein in context with the first force applications means.

If an anchor sleeve comprises multiple force application means, in a mounted state only one force application means may be used at the same time for application of an external force. Alternatively multiple force application means may be used at the same time or sequentially (e.g. alternately). At least one force application means may also be used for mounting of an anchor system, e.g. as a mounting aid for preloading of the anchor sleeve.

Good results may be obtained if the first force application means (and/or any other force application means if present) comprises a contact face to which the external force can be applied. Hence distributed and controlled force transmission into the anchor sleeve becomes possible.

For some applications, the first force application means (and/or any other force application means if present) may have an essentially annular shape. An anchor sleeve having a particularly advantageous stress and strain distribution in the region where an external force is applied can be obtained if the first force application means (and/or any other force application means if present) has an essentially annular shape and encircles the receiving opening, as will be shown in more detail below.

For some applications, the first force application means may at least partially be embedded in the sleeve base body. However, the first force application means (and/or any other force application means if present) may also be integral part of the sleeve base body. Alternatively or in addition the first force application means (and/or any other force application means if present) may be at least partially made from a continuum material, such as a metal and/or a plastic (e.g. a fiber reinforced plastic) and/or a ceramic. The first force application means (and/or any other force application means if present) may comprise multiple layers arranged adjacent and/or between layers of reinforcing fibers of the sleeve base body.

For some applications, at least part of the sleeve interior surface may be covered by a coating, such as an anti-friction coating. Alternatively or in addition an electrically insulating or electrically conducting coating may be used in order e.g. to reduce corrosion phenomena respectively e.g. ensure electrical grounding.

Alternatively or in addition, the anchor sleeve may also comprise at least insert or onsert made e.g. from a continuum material, such as a metal or plastic that may be arranged adjacent to the receiving opening in order to decrease friction between the anchor sleeve and an anchor body arranged in the receiving opening and/or to change contact mechanics and improve stress and strain distribution at the interfacial region. Such an insert or onsert may e.g. be a plate or shell element (e.g. made from a curved metal sheet). Alternatively or in addition also inserts or onserts made from fiber-reinforced plastics, in particularly such reinforced by short fibers, may be used. Such inserts as described herein may also be arranged in other regions of the sleeve base body.

In a variation of the invention, at least part of an exterior surface of the anchor sleeve are covered by a coating, such as a varnish. In particular a coating may be used in order to indicate mechanical impacts to the anchor sleeve that may have caused potentially critical damage.

The present invention is also directed to providing a method for producing of an anchor sleeve as described herein. Such a method typically comprises the method steps of: a) providing a mandrel having a mandrel outer surface that at least partially defines an inner surface of the anchor sleeve to be produced; b) laying of at least one layer of reinforcing fibers on the mandrel outer surface; c) consolidating of the at least one layer of fibers by hardening of a matrix material arranged between the fibers.

Good results may be obtained if the at least one layer of reinforcing layers is laid by filament winding. As such, e.g. dry rovings and/or rovings comprising pre-impregnated fibers (aka pre-pregs) may be processed.

In order to obtain an anchor sleeve that fits particularly well to the anchor body and hence allows to obtain a particularly advantageous stress and strain distribution, at least a part of the mandrel may be an anchor body in which at least one tension member is embedded. In such a variation, reinforcing fibers may be laid directly on at least a portion of the anchor body. Alternatively or in addition, an intermediate layer (e.g. a coating or film) may be arranged on at least a portion of the exterior surface of the anchor body. Thus, subsequent separation (if necessary) of the anchor sleeve and the anchor body becomes possible and/or volume changes during hardening of the matrix can be compensated.

The present invention is also directed to providing of an anchor system to anchor at least one tension member, the anchor system comprising an anchor sleeve as described herein and having an interior surface. The anchor system further comprises an anchor body which has an exterior surface and a reduced diameter front end and an increased diameter rear end. The anchor sleeve is configured to receive the anchor body, the exterior surface of the anchor body contacting the interior surface of the anchor sleeve.

In a variation of the invention, the anchor system may also comprise a sliding sleeve configured to be arranged between the anchor body and the anchor sleeve, comprising a sliding sleeve interior surface configured to contact at least part of the exterior surface of the anchor body and an sliding sleeve exterior surface configured to contact at least part of the sleeve interior surface of the anchor sleeve. A sliding sleeve may be integrally made or be made from multiple segments, which may facilitate installation.

BRIEF DESCRIPTION OF SEVERAL VIEWS OF THE DRAWINGS

The herein described invention will be more fully understood from the detailed description of the given herein below and the accompanying drawings, which should not be considered as limiting to the invention described in the appended claims.

DETAILED DESCRIPTION OF THE INVENTION

The foregoing summary, as well as the following detailed description of the preferred embodiments, is better understood when read in conjunction with the appended drawings. For the purposes of illustrating the invention, an embodiment that is presently preferred, in which like numerals represent similar parts throughout the several views of the drawings, it being understood, however, that the invention is not limited to the specific methods and instrumentalities disclosed.

Figure 1:
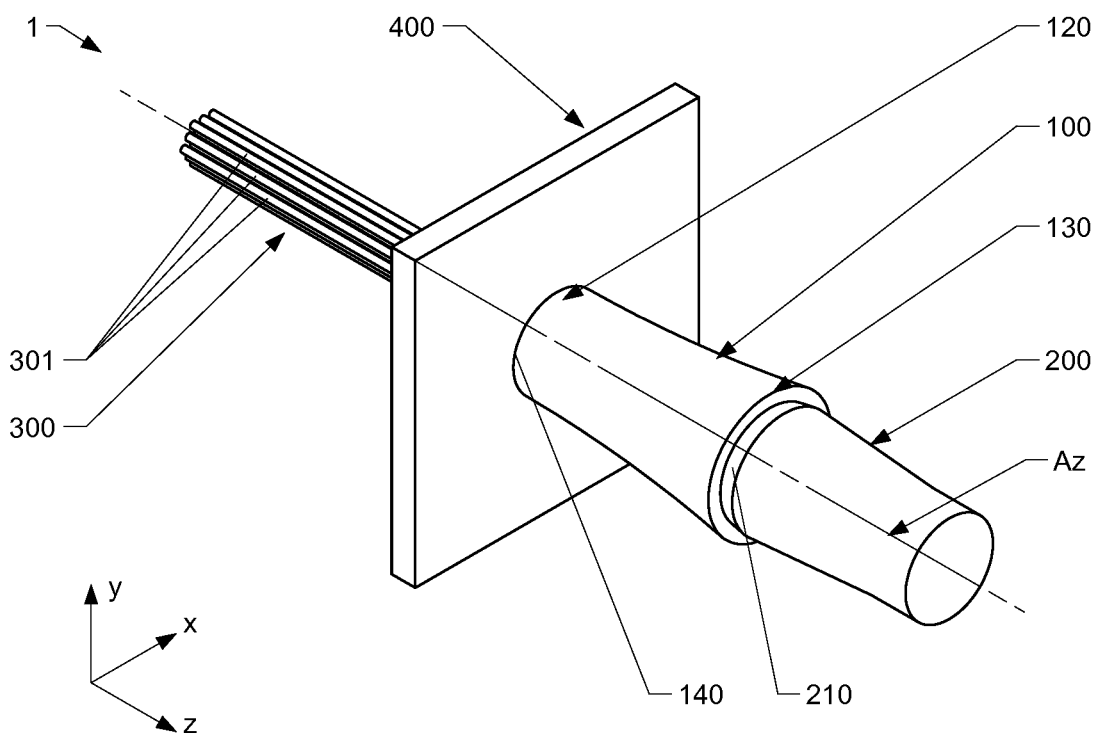
FIG. 1 schematically shows a variation of an anchor system according to the present invention comprising a variation of an anchor sleeve according to the present invention in a perspective view from above.
Figure 2:
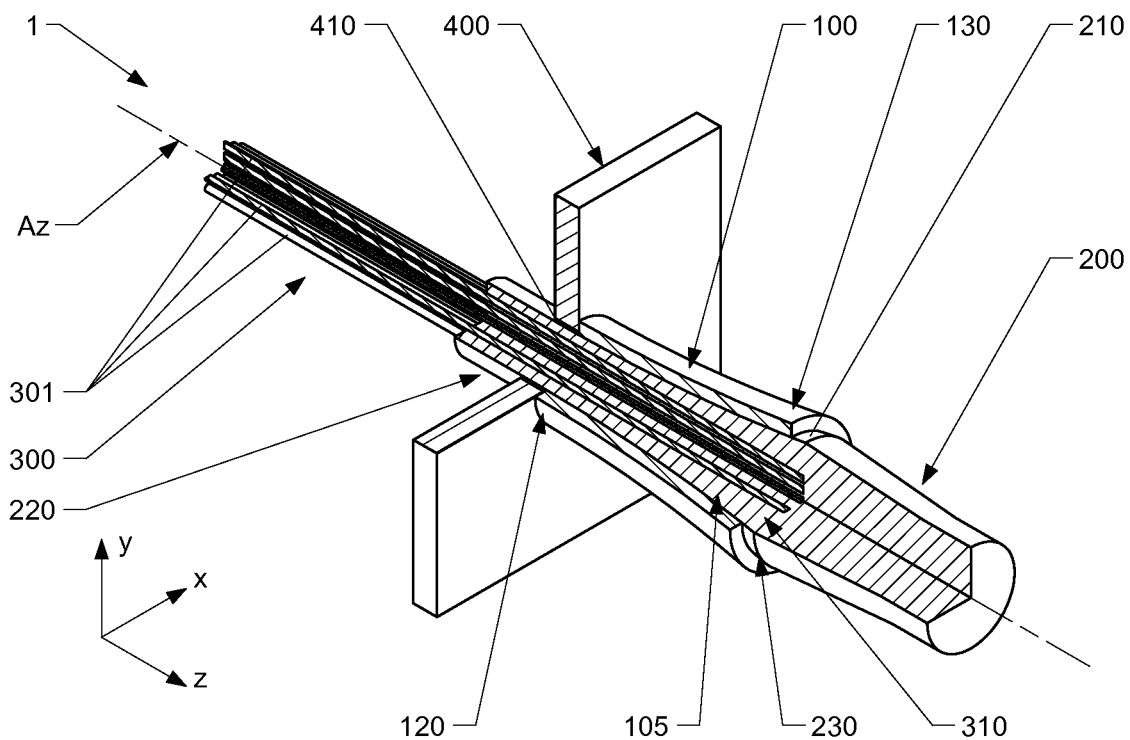
FIG. 2 depicts the anchor system of FIG. 1, part of the anchor system being clipped for illustrative purposes.
Figure 3:
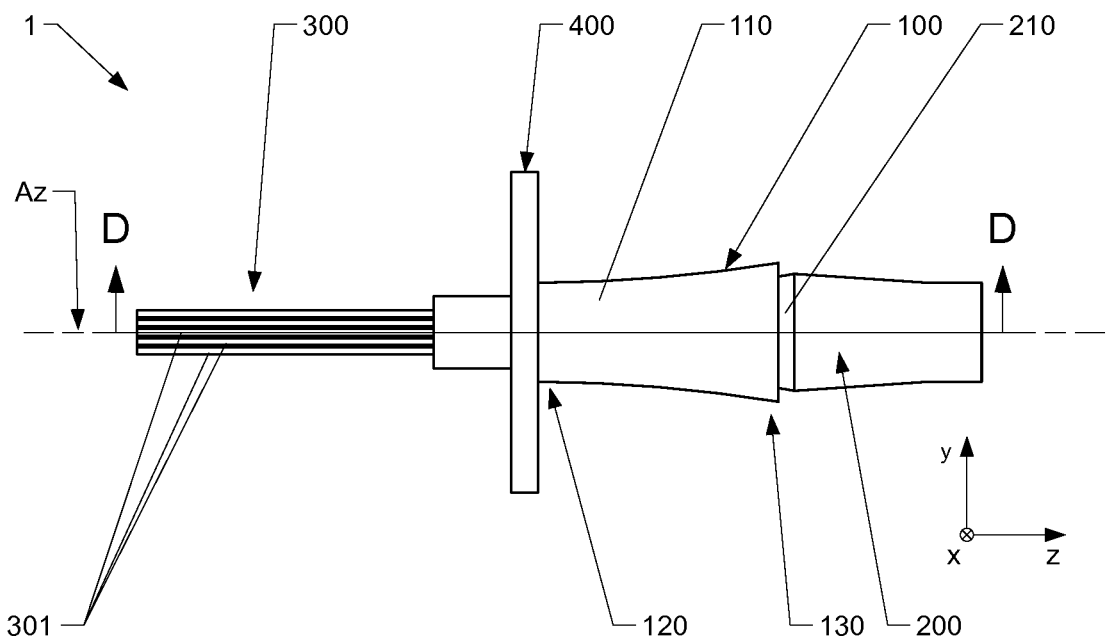
FIG. 3 schematically shows the anchor system of FIG. 1 in a front view.
Figure 4:
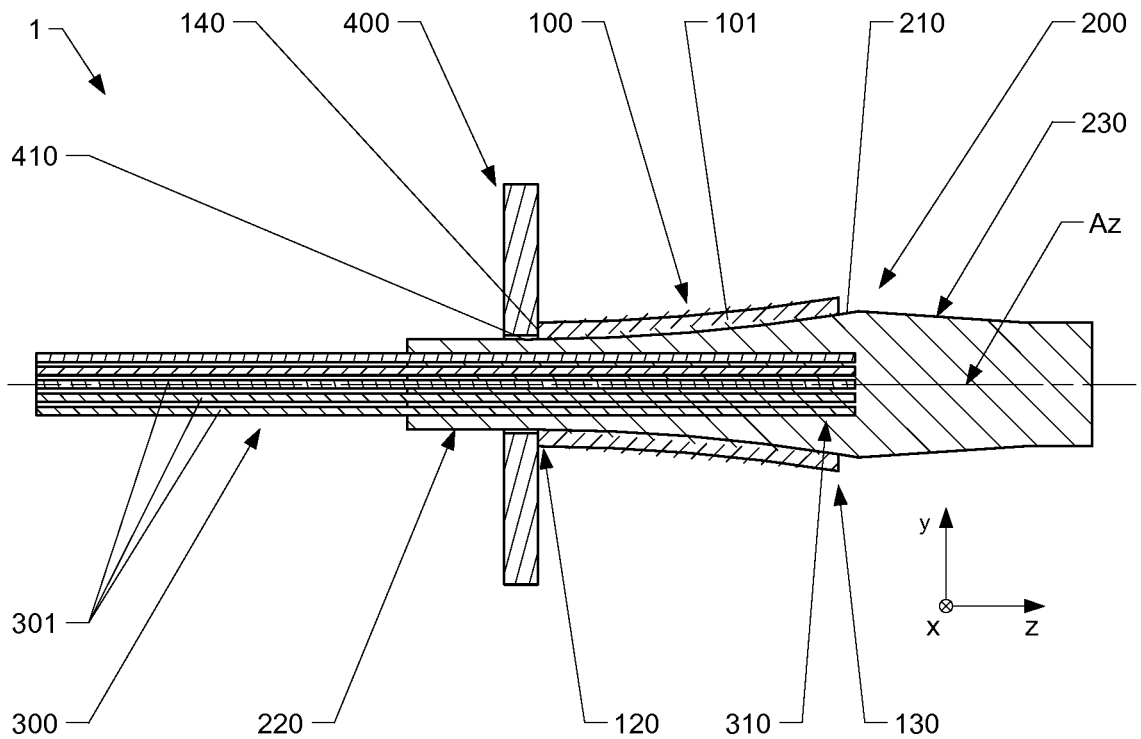
FIG. 4 shows cross-section DD of FIG. 3.

FIG. 1 to FIG. 4, schematically show a first variation of an anchor system 1 according to the present invention that will typically be used in order to anchor a tension member 300 which in the variation shown is a bundle of composite wires 301. As schematically shown in FIG. 2, a terminated end 310 of the tension member 300, respectively the composite wires 301, is embedded in an anchor body 200 which in the variation shown is made from a plastic material having a varying stiffness along a longitudinal axis Az of the anchor system 1 in order to increase the mechanical competence of the anchorage. The anchor body 200 further has an exterior surface 210 and a reduced diameter front end 220 as well as an increased diameter rear end 230. As well, the anchor system 1 comprises an anchor sleeve 100 which has a sleeve base body 101 (as subsequently will be shown in more detail with respect to FIG. 6) and in an assembled/mounted state is arranged on the anchor body 200. Therefore the anchor sleeve 100 according to the present invention comprises a receiving opening 105 that is configured to receive the anchor body 200 and extends from a sleeve front opening 121 that is arranged at a sleeve front end 120 to a sleeve rear opening 131 that is arranged at a sleeve rear end 130 as subsequently will be shown in more detail with respect to FIG. 6. The variation of a sleeve base body 101 shown in FIG. 1 to FIG. 4 is made from a fiber-reinforced plastic that comprises reinforcing fibers which are wound about the receiving opening 105. The receiving opening 105 constitutes a sleeve interior surface 110 that is configured to contact part of the exterior surface 210 of the anchor body 200 and hence allow force transmission between the anchor body 200 and the anchor sleeve 100. As also shown in FIG. 1 to FIG. 4, the anchor sleeve 100 comprises a first force application means 140 that is formed as a contacting face to contact a corresponding contacting face of a structure 400 to (respectively from) which an external force has to be transmitted. In the variation shown, the structure comprises a trough hole in which a part of the anchor body 200 is arranged and hence helps to position the anchor sleeve 200 with respect to the structure 400.

In the variation shown in FIG. 1 to FIG. 4, a final section the tension member 300 is embedded in the anchor body 200, resulting in the anchor system 1 being some type of termination of the tension member 300. However the present invention is not limited to terminations of tension members 300, but may also be arranged at sections of a tension member 300 that are a distance apart from the two ends of the tension member 300 as will subsequently be shown in FIG. 5.

Figure 5:
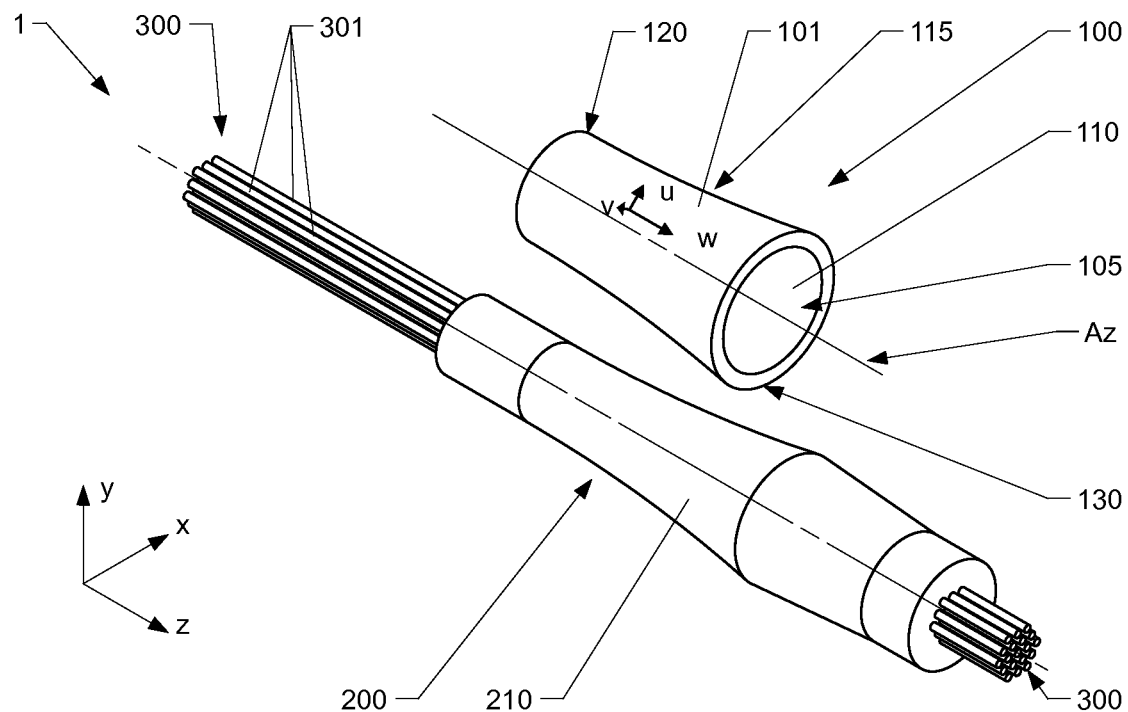
FIG. 5 schematically shows variations of an anchor sleeve and of an anchor body according to the present invention in a perspective view from above.

FIG. 5 schematically shows a variation of an anchor sleeve 100 and an anchor body 400 according to the invention that is arranged at a middle section of a tension member 300 and hence may be used to apply an external force to the tension member 300 at an essentially arbitrary position of the tension member. The anchor sleeve 100 and the anchor body 200 are shown in a disassembled state for illustrative purposes. In most applications such an anchor sleeve 100 will already be arranged at the anchor body 200 when a tension member 300 is installed. However, in certain applications the anchor sleeve 100 (and/or the anchor body 200) may even only be produced on site during installation. Therefore e.g. a wrapping robot may be used. Thus, also anchorage of very large tension members becomes possible.

The sleeve base body 101 of the anchor sleeve 100 shown in FIG. 5 comprises a sleeve middle section 115 arranged between the sleeve front end 120 and the sleeve rear end 130 and which is reinforced with reinforcing fibers that are arranged about the receiving opening 105 (respectively the longitudinal axis Az of the anchor sleeve 100). The reinforcing fibers in the sleeve middle section 115 of the variation shown in FIG. 5 have a fiber orientation of about 75° relative to the longitudinal axis Az of the sleeve base body 101, respectively a longitudinal axis w of a local material coordinate system u/v/w (please also refer to FIG. 6 for the local material coordinate system u/v/w).

Figure 6:
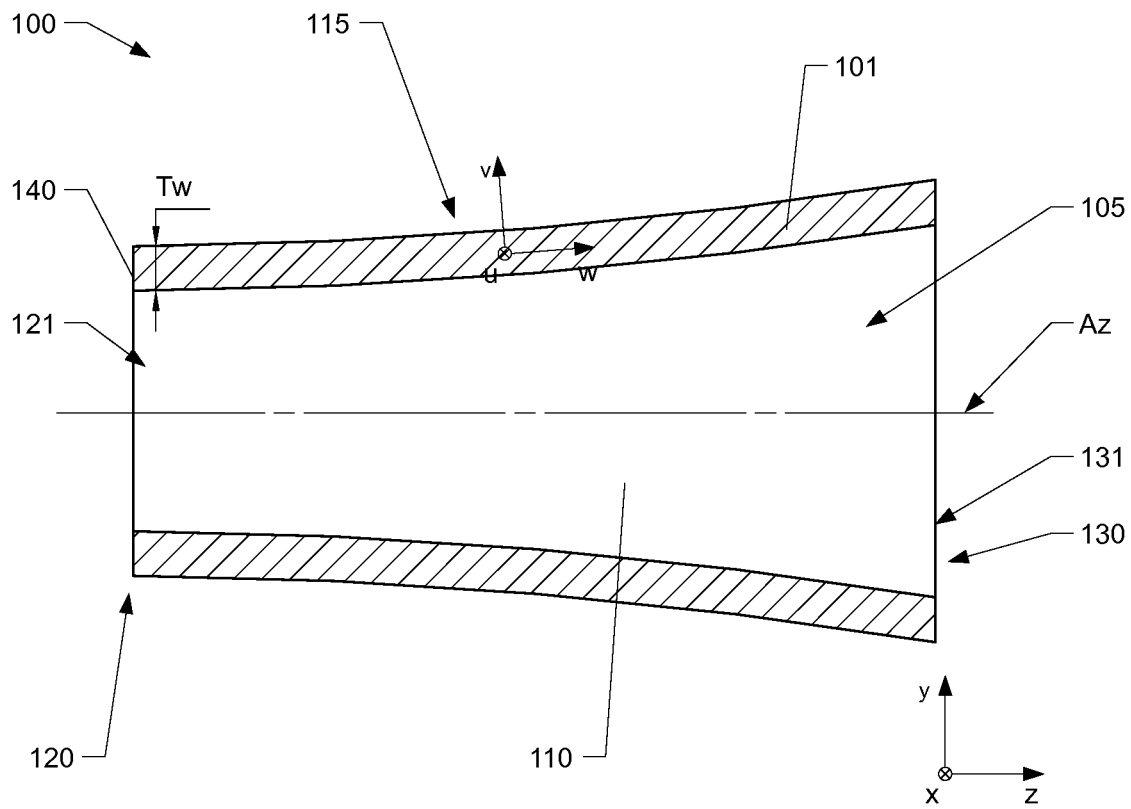
FIG. 6 schematically shows a cross-section of a variation of an anchor sleeve according to the present invention.
Figure 7:
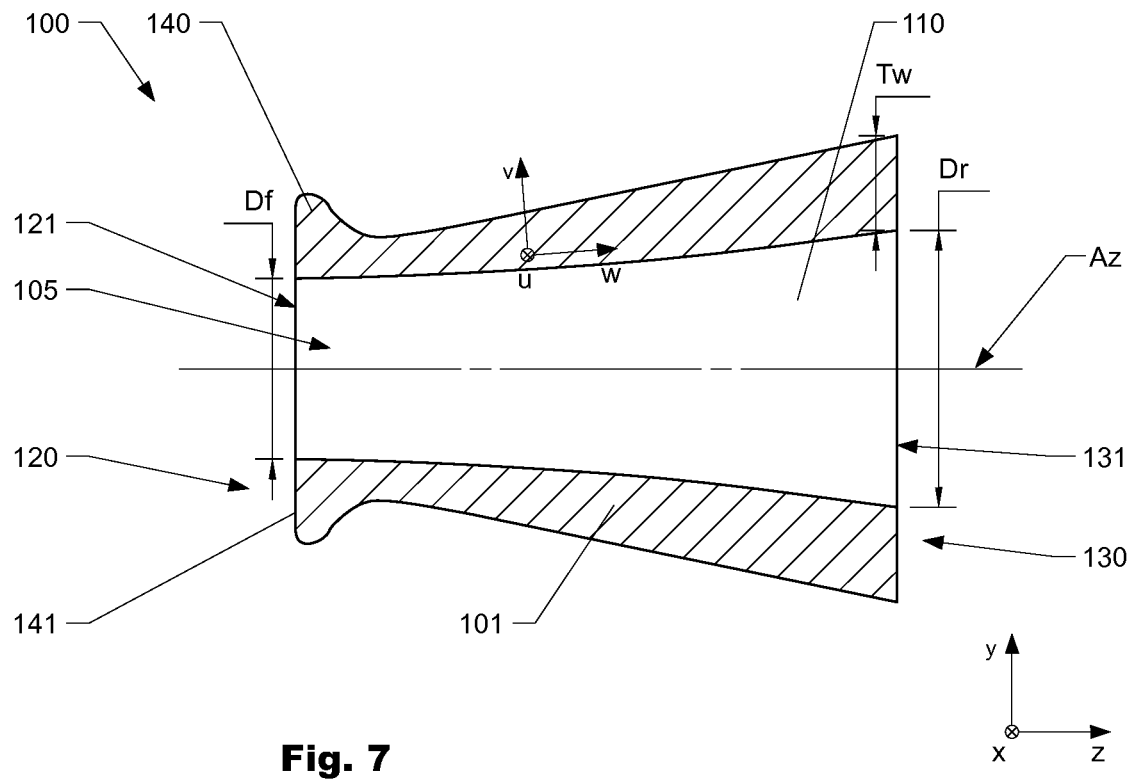
FIG. 7 schematically shows a cross-section of another variation of an anchor sleeve according to the present invention.

As illustrated in FIG. 6, according to a variation of the present invention the anchor sleeve 100 may have a sleeve interior surface 110 that has a frustum-like shape. The sleeve base body may be designed such that the wall thickness Tw of the sleeve base body 101 is essentially constant between the sleeve front end 120 and the sleeve rear end 130. However, as shown by way of example in FIG. 7 and FIG. 8, the wall thickness may also change between the sleeve front end 120 and the sleeve rear end 130. As shown in FIG. 7, the diameter Df of the sleeve front opening 121 may be smaller than the diameter Dr of the sleeve rear opening 131. Thus, again an interior surface 110 having a frustum-like shape can be obtained. However, for certain applications the diameter Df of the sleeve front opening may also be equal or even greater than the diameter Dr of the sleeve rear opening, e.g. in order to obtain a more balanced stress and strain distribution in the sleeve base body 101. It is clear that also even with the diameter Df of the sleeve front opening being equal to or greater than the diameter Dr at least a portion of the sleeve interior surface 110 may still have a frustum-like shape, the narrow end of the frustum being directed to the front opening 121 of the anchor sleeve 100. As also schematically shown in FIG. 7, the first force application means 140 may be constituted by a thickening of the sleeve base body 101, respectively a local increase in the wall thickness Tw. Thus, a particularly advantageous application of an external force to the anchor sleeve 100 can be obtained. In the variation shown in FIG. 7, the first force application means 140 is arranged at the sleeve front end 120 and comprises a contact face 141 to which the external force can be applied. In the variation shown an external force may be applied directly by means of e.g. a contact face of an external structure, as schematically shown in FIG. 1 and FIG. 2.

Figure 8:
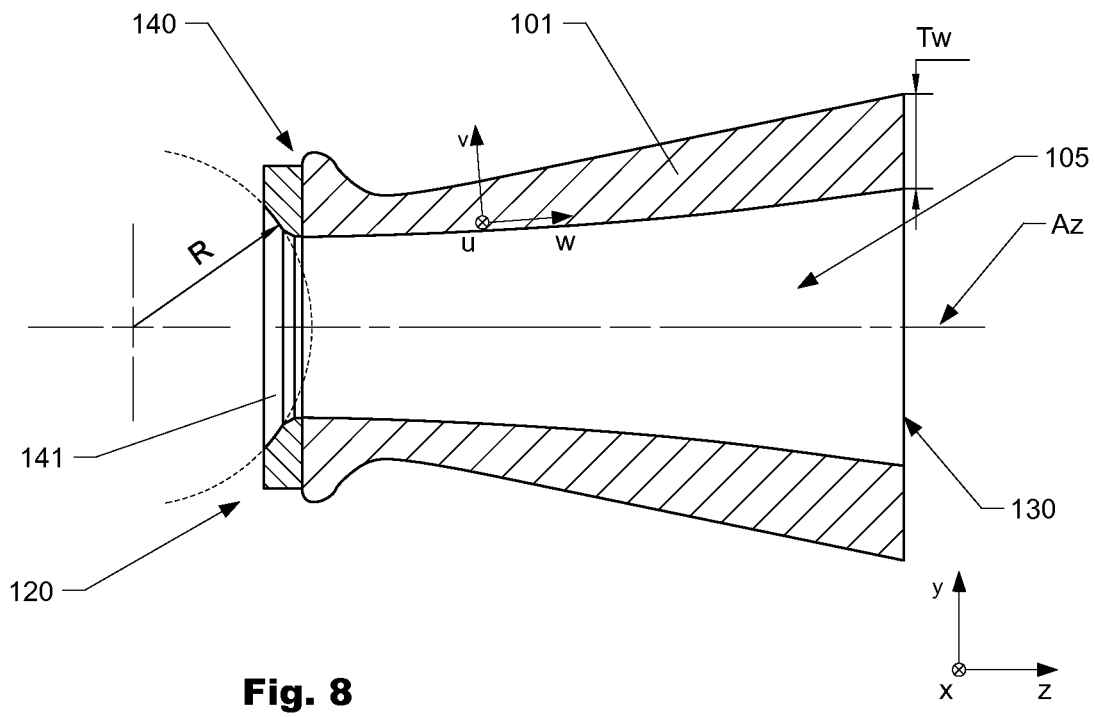
FIG. 8 schematically shows a cross-section of a further variation of an anchor sleeve according to the present invention.

As schematically shown in FIG. 8, a first force application means may also comprise multiple components, which in the variation shown are a thickening of the sleeve base body 101 as well as a compensator means 142. The thickening of the sleeve base body 101 shown is essentially made from a fiber-reinforced plastic, whereas the compensator means 142 is made from a metallic material. The compensator means comprises a contact face 141 that is spherically curved with a radius R and is arranged to be mechanically interconnected to a corresponding spherically curved contact face of an external structure. Thus potentially super-critical stress and or strain in the sleeve base body 101 due to minor misalignments of an external structure relatively to the first force application means can be prevented.

The invention claimed is:

1. An anchor sleeve (100) for an anchor system (1) suited for anchoring of a composite tension member (300), comprising:
   a. a sleeve base body (101) having
      i. a receiving opening (105) configured to receive an anchor body (200) and extending from
         1. A sleeve front opening (121)
            a. arranged at a sleeve front end (120) to
         2. a sleeve rear opening (131)
            a. arranged at a sleeve rear end (130),
   b. the sleeve base body (101) being at least partially made from a fiber-reinforced plastic comprising reinforcing fibers whereof at least a portion is wound about the receiving opening (105), wherein the sleeve base body (101) comprises a first force application means (140) to apply an external force to the sleeve base body (101), and wherein the first force application means (140) is at least partially constituted by a thickening of the sleeve base body (101).

2. The anchor sleeve (100) according to claim 1, wherein the sleeve base body (101) has an essentially rotationally symmetric shape.

3. The anchor sleeve (100) according to claim 1, wherein at least a portion of the receiving opening (105) constitutes a sleeve interior surface (110) configured to contact at least part of an exterior surface (210) of an anchor body (200).

4. The anchor sleeve (100) according to claim 3, wherein at least a portion of the sleeve interior surface (110) has a frustum-like shape.

5. The anchor sleeve (100) according to claim 1, wherein the diameter (Df) of the sleeve front opening (121) is smaller than the diameter (Dr) of the sleeve rear opening (131).

6. The anchor sleeve (100) according to claim 1, wherein a fiber volume ratio varies in the sleeve base body (101) between the sleeve front end (120) and the sleeve rear end (130).

7. The anchor sleeve (100) according to claim 1, wherein an orientation of the reinforcing fibers varies in the sleeve base body (101) between the sleeve front end (120) and the sleeve rear end (130).

8. The anchor sleeve (100) according to claim 1, wherein a first portion of fibers having a first Young's modulus (YM1) is arranged at a first distance (D1) apart from the sleeve interior surface (110) and a second portion of fibers having a second Young's modulus (YM2) is arranged at as a second distance (D2) apart from the sleeve interior surface (110), the first distance (D1) being less than the second distance (D2) and the first Young's modulus (YM1) being less than the second Young's modulus (YM2).

9. The anchor sleeve (100) according to claim 1, wherein the sleeve base body (101) comprises at least one layer of reinforcing fibers that are arranged essentially in parallel with the longitudinal axis (Az) of the sleeve base body (101).

10. The anchor sleeve (100) according to claim 1, wherein the wall thickness (Tw) of the sleeve base body (101) is essentially constant between the sleeve front end (120) and the sleeve rear end (130).

11. The anchor sleeve (100) according to claim 1, wherein the wall thickness (Tw) of the sleeve base body (101) changes between the sleeve front end (120) and the sleeve rear end (130).

12. The anchor sleeve (100) according to claim 1, wherein the sleeve base body (101) comprises at least one layer of braided fibers.

13. The anchor sleeve (100) according to claim 1, wherein the sleeve base body (101) comprises at least one layer of woven fibers.

14. The anchor sleeve (100) according to claim 1, wherein the first force application means (140) is arranged at the sleeve front end (120).

15. The anchor sleeve (100) according to claim 1, wherein the first force application means (140) comprises a contact face (141) to which the external force can be applied.

16. The anchor sleeve (100) according to claim 1, wherein at least part of the sleeve interior surface (110) is covered by a coating.

17. A method for producing of an anchor sleeve (100) according to claim 1, comprising the method steps of:
   a. providing a mandrel having a mandrel outer surface that at least partially defines an inner surface (110) of the anchor sleeve (100) to be produced;
   b. laying of at least one layer of reinforcing fibers on the mandrel outer surface; and
   c. consolidating of the at least one layer of fibers by hardening of a matrix material arranged between the fibers.

18. The method for producing of an anchor sleeve (100) according to claim 17, wherein the layers are laid by filament winding.

19. An anchor system (1) to anchor at least one tension member (300), comprising:
   a. an anchor sleeve (100) according to claim 1 having an interior surface (110); and
   b. an anchor body (200) having
      i. an exterior surface (210),
      ii. a reduced diameter front end (220),
      iii. an increased diameter rear end (230); and c. wherein the anchor sleeve (100) is configured to receive the anchor body (200), the exterior surface (210) contacting the interior surface (110).

20. An anchor sleeve (100) for an anchor system (1) suited for anchoring of a composite tension member (300), comprising:
- a. a sleeve base body (101) having
    - i. a receiving opening (105) configured to receive an anchor body (200) and extending from
        1. A sleeve front opening (121)
            a. arranged at a sleeve front end (120) to
        2. a sleeve rear opening (131)
            a. arranged at a sleeve rear end (130),
- b. the sleeve base body (101) being at least partially made from a fiber-reinforced plastic comprising reinforcing fibers whereof at least a portion is wound about the receiving opening (105), wherein the sleeve base body (101) comprises a first force application means (140) to apply an external force to the sleeve base body (101), wherein a first portion of fibers having a first Young's modulus ($YM1$) is arranged at a first distance ($D1$) apart from the sleeve interior surface (110) and a second portion of fibers having a second Young's modulus ($YM2$) is arranged at as a second distance ($D2$) apart from the sleeve interior surface (110), the first distance ($D1$) being less than the second distance ($D2$) and the first Young's modulus ($YM1$) being less than the second Young's modulus ($YM2$).

\* \* \* \* \*